United States Patent [19]
LeGrow et al.

[11] 4,359,566
[45] Nov. 16, 1982

[54] SILICONE-EPOXY COATING COMPOSITIONS

[75] Inventors: Gary E. LeGrow, Madison; Robert E. Kalinowski, Auburn, both of Mich.

[73] Assignee: Dow Corning Corporation, Midland, Mich.

[21] Appl. No.: 328,328

[22] Filed: Dec. 7, 1981

Related U.S. Application Data

[63] Continuation-in-part of Ser. No. 225,218, Jan. 15, 1981, abandoned.

[51] Int. Cl.$^3$ ............................................. C08G 77/06
[52] U.S. Cl. ...................................... 528/16; 525/475; 525/476
[58] Field of Search ................... 525/476, 475; 528/16, 528/17, 33

[56] References Cited

U.S. PATENT DOCUMENTS

| 3,287,160 | 11/1966 | Ender | 117/132 |
| 3,758,423 | 9/1973 | Taylor | 260/2 EC |
| 3,971,747 | 7/1976 | Bank et al. | 260/37 SB |
| 4,332,923 | 6/1982 | Rainear | 528/16 |

*Primary Examiner*—Melvyn I. Marquis
*Attorney, Agent, or Firm*—Richard A. Kaba

[57] ABSTRACT

Compositions suitable for sprayable, flexible coatings for food containers are made by mixing cycloaliphatic or bisphenol-A-epichlorohydrin epoxy resins, an alkoxylated monophenylsiloxane-dimethylsiloxane copolymer and aluminum chelates of beta-dicarbonyl compounds. Optionally, the coatings can contain phenyltrialkoxysilane.

8 Claims, No Drawings

SILICONE-EPOXY COATING COMPOSITIONS

BACKGROUND OF THE INVENTION

This is a continuation-in-part of application Ser. No. 225,218, filed Jan. 15, 1981 and now abandoned.

It is known from U.S. Pat. No. 3,971,747 that silanol-containing organosilicon compounds can be reacted with epoxy resins in the presence of aluminum catalysts.

The copending application of Michael A. Lutz, Ser. No. 205,228, filed Nov. 10, 1980, claims broadly the aluminum catalyzed reaction of alkoxy silicon compounds with epoxy resins.

This invention is an improvement over the Lutz disclosure in that the compositions are particularly adaptable for coating flexible substrates which are subject to severe bending, such as, for example, the metal lids for food containers, aluminum siding for houses, etc. Thus, the advance in the art of the present invention is the provision of flexible, tightly adhering coatings for metals and other substrates which combine the benefits of epoxy resins, such as acid resistance and the benefits of organosilicon compounds such as weather and water resistance. The present coatings are also cured with non-toxic, fast acting catalysts so that they can be cured in reasonable lengths of time at reasonable temperatures. In addition, the coating compositions of this invention are liquid and can be sprayed or otherwise easily applied to substrates without the necessity of using solvents which are environmentally objectionable or of using water which requires considerable energy in order to evaporate it.

SUMMARY OF THE INVENTION

This invention relates to compositions of matter which are suitable for spray coating consisting essentially of (1) from 50 to 80 percent by weight of a cycloaliphatic epoxy resin or a bisphenol A epoxy resin, (2) from 6 to 25 percent by weight of a alkoxylated siloxane copolymer of monophenylsiloxane and dimethylsiloxane units in a mol ratio of from 2.1:1 to 1.9:1, (2) containing from 10 to 20 percent by weight alkoxy groups having from 1 to 2 carbon atoms, (3) from 0 to 40 percent by weight of phenyltrimethoxysilane or phenyltriethoxysilane and (4) from 0.04 to 1.2 percent by weight of an aluminum chelate of a beta-dicarbonyl compound.

The epoxy resins employed in this invention are cycloaliphatic epoxy resins which means that at least one epoxy group is attached to a cycloaliphatic ring. Examples of such cycloaliphatic epoxy resins are vinylcyclohexane dioxide, bis-3,4-epoxy-6-methylcyclohexyl-methyl adipate, 3,4-epoxycyclohexylmethyl-3,4-epoxycyclohexane carboxylate, 3,4-epoxy-6-methylcyclohexylmethyl, 3,4-epoxy-6-methylcyclohexane carboxylate, epoxycyclohexylspiroepoxycyclohexane dioxide and those epoxy resins described in U.S. Pat. No. 4,038,338 which is hereby incorporated by reference.

The other type of epoxy resins employed herein are diglycidyl ethers of bisphenol A. These are well known commercial materials and are made by the reaction of epichlorohydrin with bisphenol A and they may be represented by the formula

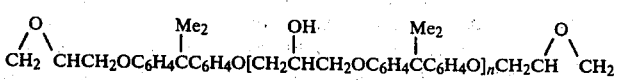

in which Me is methyl and n is 0 or an integer.

The epoxy resins employed herein are either liquid or low melting compositions and when they are mixed with the siloxane (2) and any additional phenyltrialkoxysilane they are liquid compositions which can be sprayed. In some cases it may be desirable to employ up to 20% solvent such as ketones, esters or others to further reduce the viscosity of the mixture.

The siloxanes employed herein are alkoxylated copolymers of monophenylsiloxane and dimethylsiloxane units in which the ratio of monophenylsiloxane to dimethylsiloxane units is in the range from 2.1:1 to 1.9:1. Compositions outside this range do not give suitable coatings. The weight of alkoxy groups in the siloxane is not critical but can vary from 10 to 20 percent by weight. These products can be made by the cohydrolysis of the corresponding phenyltrialkoxysilane and dimethyldialkoxysilane or by the equilibration of phenyltrialkoxysilane with dimethylpolysiloxane cyclics or with hydroxyl endblocked polydimethylsiloxanes. Procedures for making such materials are well known.

The aluminum catalysts employed in this invention are chelates of beta-dicarbonyl compounds having the formula

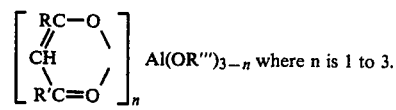 where n is 1 to 3.

These materials are well known articles of commerce. The beta-dicarbonyl compounds are of the formula

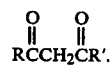

In the above formulae R and R' can be hydrocarbon or halohydrocarbon or a radical of the formula R"O— in which R" is hydrocarbon or halohydrocarbon. Thus it can be seen that the beta-dicarbonyl compounds can be beta-diketones, beta-ketoesters of the formula

or beta-diesters of the formula

For the purpose of this invention R, R' and R" can each be a hydrocarbon radical such as methyl, ethyl, propyl, phenyl or cyclohexyl or a halohydrocarbon radical such as trifluoromethyl, trifluoropropyl, chloropropyl, chloromethyl, etc.

In addition to the chelate groups, the catalysts of this invention can also have OR''' groups (where R''' is hydrocarbon or carboxy acyl) attached to the aluminum. Examples of OR''' groups are alkoxy groups, such as methoxy, isopropoxy, butoxy, hexyloxy or carboxy acyl groups such as octoate groups or stearate groups. Specific examples of catalysts which are operative in this invention are aluminum tris acetylacetonate, aluminum tris acetoacetic ester chelate, aluminum tris diethylmalonate, aluminum diisopropoxy acetoacetic ester chelate, aluminum tris hexafluoroacetylacetonate and aluminum isopropoxy stearate acetoacetic ester chelate. The catalysts of this invention can be dissolved in an organic solvent or can be added neat to form the compositions of this invention.

The compositions of this invention can be cured by heating them at any desired temperature. Preferably the temperature of cure is in the range of from 150° to 200° C. for times ranging from 1 to 10 minutes. This range gives the best properties in the cured films.

The compositions of this invention can be coated on any substrate such as metal, glass, ceramic or plastics such as polycarbonate or polyacrylates. If desired, the compositions of this invention can contain additives such as pigments, ultraviolet stabilizers, solvents, etc.

The hardness of the cured films shown in the examples was obtained using ASTM-D-3363-74.

The flexibility and the adhesion of the films was obtained by the T-bend test which is as follows. The material was coated on an aluminum panel and cured and the thickness of the coating is noted. The aluminum panels used are described in the Examples. The cured panel was then secured firmly in a vice and bent over on itself, keeping the cured film on the outside of the bend. If the film survives this bend without cracking, it is said to have a T-bend of 0. If the film does not survive this first bend, the coated panel was then bent over on itself a second time. This process is repeated by bending the panel over on itself until a bend is obtained where the film does not crack. After the first bend, all required bends are made using the previous bent section or sections both as a guide and as a shim to increase the radius of the next bend. For example, if the film does not crack the third time the panel is bent on itself, the flex is recorded as 2T. The smaller the number of bends at which the film does not break, the more flexible the film.

The adhesion of the film is measured the same way except that after each bend adhesion tape is placed along the bend and pulled away from the film. The number of bends at which no film is removed is recorded as in the flex test.

The solvent resistance of the cured coatings was determined as follows. The materials used are cheese cloth, curity grade 20, a ball peen hammer having a head weight of 1.5 pounds (680.4 g) and an aluminum panel as described in the Examples. The solvent used in every case below was methylethylketone.

The procedure used was to apply the material to the aluminum panel and cure it as shown in the examples. The film thickness was then determined and noted. Six layers of the cheese cloth were tightly wrapped around the ball end of the hammer and secured tightly. Methylethylketone was applied to the cheesecloth at the tip of the ball until the cloth is saturated but not dripping. The ball was immediately placed on the film and the hammer grasped 25 cm from the ball and the ball and the cloth moved back and forth for a distance of 5 to 10 cm in a straight line without any additional pressure other than the weight of the hammer. One stroke back and forth was counted as a single cycle. The rubbing speed was between 80 and 120 cycles per minute and the strokes were continued until the first sign of bare substrate was visible. If the number of cycles exceeded 200, the test was discontinued and the results reported as greater than 200.

The epoxy resin used in Example 1 has the structure

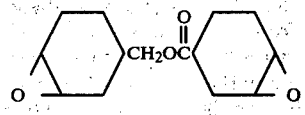

Except where noted otherwise, in the Examples, the aluminum catalyst was added as a 10% by weight solution in toluene.

The following examples are illustrative only and do not limit the invention which is properly delineated in the appended claims. It will be apparent to those having ordinary skill in silicone technology, that in addition to the specific examples of epoxy resins, organosilicon compounds and aluminum catalysts shown in the examples, that any epoxy resin, any organosilicon compound, and any aluminum catalyst within the scope of the claims would also operate.

EXAMPLE 1

The epoxy resin (1) used in this example is 3,4-epoxycyclohexylmethyl-3,4-epoxycyclohexane carboxylate. The siloxane (2) employed was a copolymer of 66 mol percent monophenylsiloxane units and 34 mol percent dimethylsiloxane units having 16.44 percent by weight silicon-bonded methoxy groups. The catalyst (4) employed was aluminum tris acetylacetonate.

Formulation A was made by mixing 80 parts by weight (1), 19.95 parts (2) and 0.05 parts (4). The liquid formulation was applied to phosphate treated sheet aluminum (22.9 cm×7.6cm×0.03 cm, from Dexter Corp., Midland Division, Waukegan, IL) and cured 2 minutes at 200° C. to give films of 0.1 to 0.2 mils (0.0254 to 0.0508 mm) thickness. The properties of the resulting films were found to be, resistance to methylethylketone: greater than 200, pencil hardness: 4 H, flex: 5 T, adhesion: 0 T.

Formulation B consisted of 68 parts (1), 19.45 parts (2), 12.5 parts phenyltrimethoxysilane (3) and 0.05 parts (4). The resulting film had the following properties. Resistance to methylethylketone: >200, pencil hardness: H, flex: 4 T and adhesion: 3 T.

EXAMPLE 2

The epoxy resin used in this example was a bisphenol A epichlorohydrin reaction product having an epoxy equivalent weight of 172–176 and a viscosity of 4000 to 5500 cps at 25° C.

Formulation A-55 parts of this resin were mixed with 7.24 parts of (2) of Example 1, 37.5 parts phenyltrimethoxysilane (3) and 0.26 parts of catalyst (4) of Example 1. The mixture was applied to the same aluminum panels as in Example 1 and cured 5 minutes at 200° C. to give films of 0.1 to 0.2 mils thickness. These films had the following properties: resistance to methylethylketone: >200, pencil hardness: 7 H, flex: 3 T and adhesion: 1 T.

Formulation B-Identical properties (as in Formulation A of this Example) were obtained with the formulation 65 parts of the epoxy resin, 9.7 parts (2) of Example 1, 25 parts phenyltrimethoxysilane (3) and 0.3 parts catalyst (4) of Example 1, except that flex was found to be 5 T.

EXAMPLE 3

This example employs the catalyst aluminum isopropoxy methoxy ethylacetoacetate chelate. The aluminum catalyst was added as 50% by weight solution in butyl acetate.

Formulation A was a mixture of 54.6 parts of the epoxy resin of Example 2, 7.2 parts (2) of Example 1, 37.2 parts of phenyltrimethoxysilane (3) and 1.0 part of the catalyst.

Formulation B was a mixture of 79.2 parts of the epoxy resin of Example 1, 19.8 parts (2) of Example 1 and 1.0 part of the catalyst of this example.

Formulation A was applied to the phosphate treated aluminum panels as in Example 1 and cured 5 minuts at 200° C. to give films of 0.08 to a 0.26 mil thickness with the following properties: solvent resistance: >200, pencil hardness: 2 H, flex: 0 T and adhesion: 1 T.

Formulation B was applied to the same type panel and cured for 10 minutes at 200° C. to give films 0.18 to 0.22 mil thickness. The properties were as follows: solvent resistance: >200, pencil hardness: 2 H, and flex: 5 T. The adhesion was tested by bending the panel around mandrils and it was found that the film passed the 0.25 inch (63.5 mm) mandril test.

EXAMPLE 4

This example shows curing the compositions of this invention at different temperatures. The formulation used consisted of 75 parts of the epoxy resin of Example 1, 10 parts of the siloxane (2) of Example 1, 15 parts of phenyltrimethoxysilane, and 0.05 parts of aluminum tris acetylacetonate. This formulation was coated on Alodine aluminum panels (22.9 cm×7.6 cm×0.06 cm, from the Q-Panel Company, Cleveland, OH) as in Example 1 and cured as follows with the following results:

| Cure Time | Flex | Adhesion |
| --- | --- | --- |
| 1 min. at 150° C. | 3 T | 9 T |
| 10 min. at 150° C. | 1 T | 4 T |
| 5.5 min. at 175° C. | 1 T* | 5 T* |
| 1 min. at 200° C. | 1 T | 7 T |
| 10 min. at 200° C. | 0 T | 2 T |

*Average of three runs.

That which is claimed is:

1. A composition of matter suitable for spray coating consisting essentially of (1) 50 to 80 percent by weight of a cycloaliphatic epoxy resin or a bisphenol A epoxy resin, (2) from 6 to 25 percent by weight of an alkoxylated siloxane copolymer of monophenylsiloxane and dimethylsiloxane units in a mol ratio of from 2:1 to 1.9:1, (2) containing from 10 to 20 percent by weight silicon-bonded alkoxy groups having 1 to 2 carbon atoms, (3) from 0 to 40 percent by weight phenyltrimethoxysilane or phenyltriethoxysilane and (4) from 0.04 to 1.2 percent by weight of an aluminum chelate of a beta-dicarbonyl compound.

2. A composition of claim 1 in which (4) is present at from 0.04 to 0.5 percent by weight.

3. A composition of claim 2 in which (2) is a methoxylated siloxane and (3) is phenyltrimethoxy silane.

4. A composition of claim 3 in which (4) is aluminum tris acetyl acetonate.

5. A composition of claim 3 in which (1) is 3,4-epoxycyclohexylmethyl-3,4-epoxycyclohexane carboxylate and (4) is aluminum tris acetylacetonate.

6. A composition of claim 3 in which (1) is a reaction product of epichlorohydrin and bisphenol A.

7. A substrate coated with a cured compostion of claims 1, 2, 3, 4, 5, or 6.

8. A composition of claims 1 or 2 in which (1) is 3,4-epoxycyclohexylmethyl-3,4-epoxycyclohexane carboxylate, (3) is 0 and (4) is aluminum tris acetylacetonate.

* * * * *

UNITED STATES PATENT AND TRADEMARK OFFICE
CERTIFICATE OF CORRECTION

PATENT NO. : 4,359,566

DATED : November 16, 1982

INVENTOR(S) : Gary E. LeGrow et al.

It is certified that error appears in the above-identified patent and that said Letters Patent is hereby corrected as shown below:

In Column 5, line 36; the line reading "phenyltrimethoxysilane, and 0.05 parts of aluminum tris" should read "phenyltrimethoxysilane, and 0.05 parts aluminum tris"

In Column 6 the Claims, line 17; the line reading "dimethylsiloxane units in a mol ratio of from 2:1 to 1.9:1," should read "dimethylsiloxane units in a mol ratio of from 2.1:1 to 1.9:1,"

Signed and Sealed this

Thirty-first Day of May 1983

[SEAL]

Attest:

DONALD J. QUIGG

Attesting Officer    Acting Commissioner of Patents and Trademarks